United States Patent
Volk

[19]

[11] Patent Number: 6,074,295
[45] Date of Patent: Jun. 13, 2000

[54] FRESH AIR NOZZLE DEVICE

[75] Inventor: Siegfried Volk, Kronach-Neuses, Germany

[73] Assignee: Franz Schneider Kunststoffwerk GmbH & Co. KG, Kronach-Neuses, Germany

[21] Appl. No.: 09/333,572

[22] Filed: Jun. 16, 1999

Related U.S. Application Data

[63] Continuation of application No. PCT/DE98/02919, Oct. 1, 1998.

[30] Foreign Application Priority Data

Oct. 17, 1997 [DE] Germany ............................ 197 45 932

[51] Int. Cl.[7] .................................................. B60H 1/34
[52] U.S. Cl. ................................................. 454/152
[58] Field of Search ................................... 454/154, 155, 454/286

[56] References Cited

U.S. PATENT DOCUMENTS 3,835,759  9/1974  Lloyd ...................................... 454/154
5,538,470  7/1996  Norbury, Jr. e al. .

FOREIGN PATENT DOCUMENTS 0 064 769 A1  11/1982  European Pat. Off. .
82 14 184 U   9/1982   Germany .
39 17 572 C2  6/1990   Germany .
35 03 229 A1  7/1990   Germany .
196 50 906A1  6/1997   Germany .
59-011914     1/1984   Japan .

*Primary Examiner*—Denise L. Ferensic
*Assistant Examiner*—Derek Boles
*Attorney, Agent, or Firm*—Hoffman & Baron, LLP

[57] ABSTRACT

There is described a fresh air nozzle device (10) for the passenger compartment of a vehicle, having a closure flap (20) and an actuating element (60) connected to the closure flap (20). The closure flap (20) is displaceable about a spindle (22) in the housing (12) between a closure position and an open position. At the outlet side the housing (12) has a circular opening edge (18) at which there is rotatably provided an actuating ring (28) forming the actuating element (60). The actuating ring (28) is provided with an arcuately curved toothed rack element (38) which extends along a peripheral portion of the actuating ring (28). The toothed rack element (38) meshes with a drive gear (44) of a gear transmission (46) which is provided on the housing (12) and which is provided with resiliently yielding spoke elements (52). The gear transmission (46) has a driven gear (58) which is connected to the spindle (22) of the closure flap (20).

5 Claims, 2 Drawing Sheets

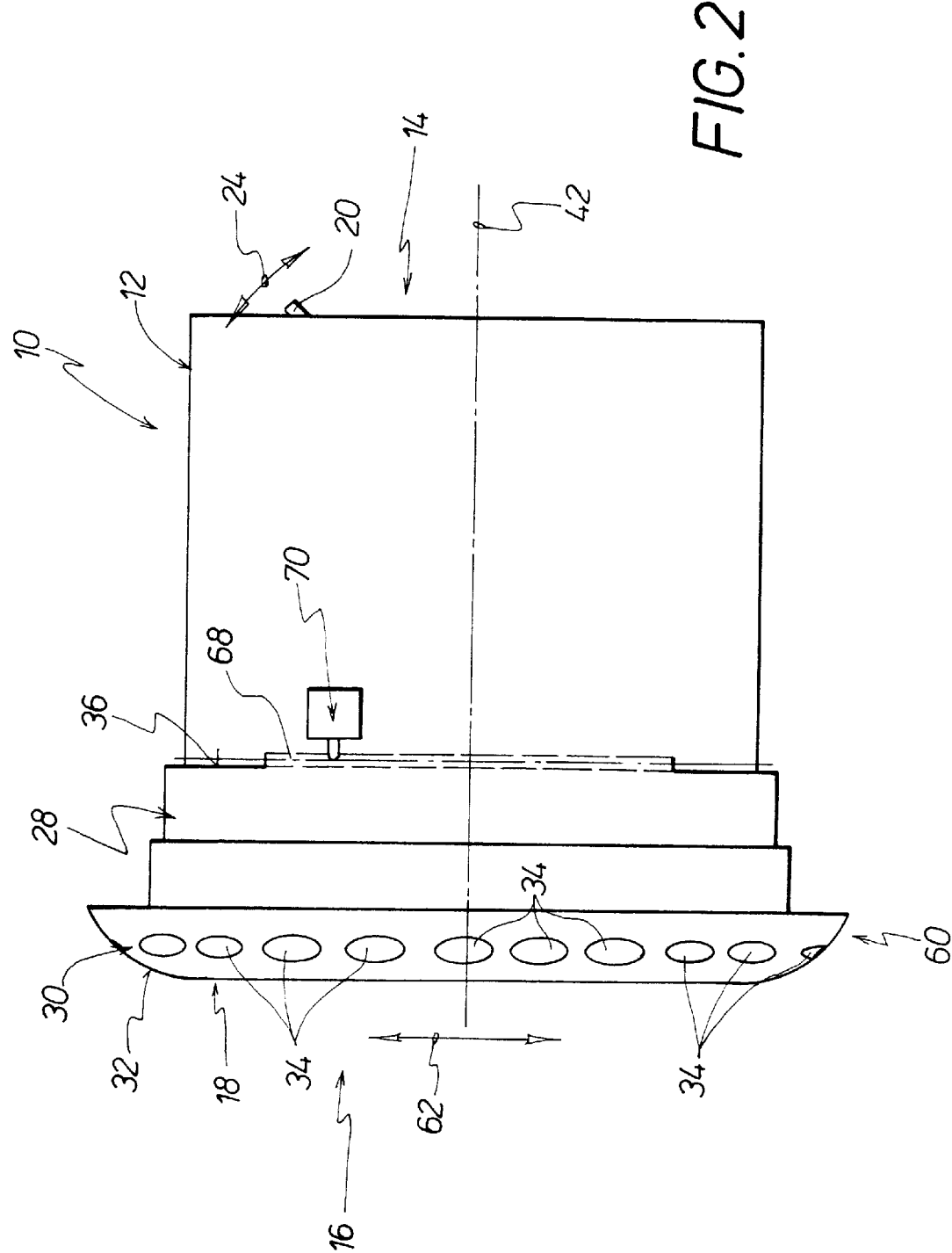

FRESH AIR NOZZLE DEVICE

This application is a continuation of International Application No. PCT/DE98/02919, filed on Oct. 1, 1998.

The invention concerns a fresh air nozzle device for the passenger compartment of a vehicle, comprising a closure flap which is mounted in a housing at the inlet side by means of a spindle, and an actuating element which is connected to the closure flap, wherein at the outlet side the housing has a circular opening edge at which there is rotatably provided an actuating ring which forms the actuating element and which is provided with a toothed rack element which extends along a peripheral portion of the actuating ring and meshes with a gear element mounted at the spindle of the closure flap.

A fresh air nozzle device of that kind is known from DE 35 03 229 A1. In that known nozzle device the toothed rack element is provided with its tooth arrangement in one plane so that the gear element which is rigidly provided on a rotary spindle and which meshes with the tooth arrangement of the toothed rack is in meshing engagement with the same force at any time, that is to say, in any rotational angular position.

DE 39 17 572 C2 discloses an actuating device for a manually adjustable air flow regulation arrangement for an air outlet opening having a control element which for setting a desired angular position engages a shutter member of the air flow regulating arrangement, the shutter member being disposed in a slider housing adjustably in respect of its angular position. A manual actuating means is mechanically connected to the control element for displacing same and includes an actuating portion which can be reached by hand and which projects with respect to the slider housing. In that arrangement the manual actuating device is mounted rotatably on a base by frictional engagement. For applying a hold-down force to the manual actuating arrangement towards the base, that assembly has a holding element which is in frictional engagement with the side of the manual actuating arrangement, that is remote from the base. The holding element can include a central pin or trunnion portion, relative to which the manual actuating arrangement is angularly displaceable, and it may have an annular contact portion which is disposed concentrically with respect to the central pin portion and on which is provided the surface for contact with a second surface of the manual actuating arrangement. The central pin portion and the annular contact portion can be connected together by at least one resilient leg portion. As in that arrangement the annular contact portion is disposed in concentric relationship with the central pin or trunnion portion, in this case also the conditions in regard to the forces involved—as in the structure in accordance with above-discussed DE 35 03 229 A1—are unchanged and constant, that is to say they remain the same, in any rotational angular position of the holding element.

DE 196 50 906 A1 discloses a motor vehicle ventilation arrangement in which fluttering of the flaps and thus the generation of noise is prevented by virtue of the fact that flexurally stiff flaps rest on a resilient sealing ring and are spring-loaded. The pivotal movement of the flaps is damped by a viscous braking device.

U.S. Pat. No. 5,538,470 discloses a nozzle device having a ratchet element.

JP-Abstract No 95 01 1914 discloses a fresh air nozzle device having a cylindrical housing. The housing is combined with a fin. The fresh air nozzle device also has a first and a second housing portion. The fin can be pivoted to permit a through-flow of air. That known fresh air nozzle device makes it possible to adjust the air flow in two directions in space which are different from each other.

EP 0 064 769 A1 describes a ventilation arrangement for ventilating rooms with a ventilation grid or grating. The ventilation grating comprises legs which are fixedly arranged at spacings from each other and which form ventilation slots between them. That ventilation arrangement has cover plates or panels which serve to regulate the amount of air flowing through the ventilation arrangement. The arrangement has at least two cover plates or panels which are pivotably mounted to the legs of the ventilation grating. The cover plates or panels can be steplessly pivoted to and fro between a closed position and an open position, by means of an adjusting device. The adjusting device extends through the ventilation grating. For that purpose one end of the adjusting device is connected to the cover plates or panels.

DE 82 14 184 U1 discloses a ball-type ventilator having two shell portions which are fitted to each other with their edges and which have a guide ring engaging thereover. The one shell portion is provided with an air inlet opening and the other shell portion is provided with an air outlet opening. The edge of the hole of the air outlet opening is concentrically embraced by an adjusting ring having a central pin or projection. At its free end portion the central pin or projection carries a closure plate which, by virtue of a rotary movement of the adjusting ring, makes it possible to close the air inlet opening.

The object of the present invention is to provide a fresh air nozzle device of the kind set forth in the opening part of this specification, in which, upon rotation of the actuating ring, a change in the rotational resistance, that is to say the amount of force applied, arises out of the fact that the application of force is increased in the region of the two limit positions of the closure flap.

In accordance with the invention, in a fresh air nozzle device of the kind set forth in the opening part of this specification, that object is attained in that the gear element is a drive gear of a gear transmission which is provided on the housing and which has a driven gear, that the toothed rack element is disposed in an arcuately curved configuration such that with its two end portions which are remote from each other in the peripheral direction it projects rearwardly out of a central plane which is perpendicular to the longitudinal axis of the housing, and that the drive gear meshing with the arcuately curved toothed rack element has a gear ring connected to a gear hub by means of resiliently yielding spoke elements.

Such a design configuration provides that the amount of force for rotating the actuating ring from a central position towards the two limit positions respectively increases so that the two limit positions can be virtually felt or detected by virtue of the increasing rotational resistance. That signifies an enhancement in terms of operating comfort and convenience.

In accordance with the invention there is a variation in the rotational resistance when rotating the actuating ring, wherein the force applied for rotating the actuating ring is increased in the region of the two end portions of the arcuately curved toothed rack element because the tooth pressure there is increased between the toothed rack element and the drive gear of the gear transmission. The increase in resistance when rotating the actuating ring means that it is consequently possible to detect that the arrangement has reached one limit position or the other of the closure flap, that is to say the opening or the closing position respectively of the closure flap.

The fact that the drive gear which meshes with the arcuately curved toothed rack element has a gear ring which is connected to a gear hub by means of resiliently yielding spoke elements provides that the drive gear of the gear transmission between the arcuately curved toothed rack element of the actuating ring and the gear transmission, for connecting the actuating ring to the closure flap, with the gear hub mounted stationarily on the housing of the fresh air nozzle device, is of a suitably resiliently yielding nature in order to be in definedly meshing engagement in any rotational angular position of the actuating ring as between the drive gear and the arcuately curved toothed rack element.

Actuation which is further optimised, or a still further optimised level of performance in terms of force or torque, for the actuating ring of the fresh air nozzle device according to the invention, can be achieved if a gear of the gear transmission meshes with a gear of a fluid brake. Fluid brakes of that kind are known per se and they are available at low cost.

The gear of the fluid brake can mesh for example with the drive gear of the gear transmission.

In accordance with the invention the actuating ring, at a spacing from the toothed rack element, can be provided with a fine ratchet tooth arrangement which is provided in the peripheral direction and into which a ratchet element resiliently engages. With such a design configuration for the fresh air nozzle device according to the invention the actuating ring which can be connected to a control ring is therefore not simply continuously rotatable but is rotatable in fine angular steps corresponding to the fine ratchet tooth arrangement, and that can have an advantageous effect on the adjusting performance of the actuating element of the fresh air nozzle device for producing the desired adjustment of the closure flap.

It is possible for example for the actuating ring at its visible side to be of any configuration as desired based on the company identity of a vehicle manufacturer. That applies in particular in regard to the situation where, in the fresh air nozzle device according to the invention, the actuating ring is connected to a control ring. At the visible side the control ring may bear indentations, grooves, fluting or any other surface configuration that may be desired. The control ring or the actuating ring can be smooth, or it may bear indentations, an edging or flanging configuration, or the like. It may consist of plastic material or metal. The visible side can be bare or painted. It may also have for example an in-mold decoration in order for example to simulate a wood-grain effect. The ring can be produced in a two-component process.

Further details, features and advantages will be apparent from the following description of an embodiment, illustrated in the drawing, of the fresh air nozzle device according to the invention. In the drawing:

FIG. 2 shows a further side view of the fresh air nozzle device of FIG. 1 from a direction of view which is opposite through 180° with respect to the direction of view shown in FIG. 1.

Figure 1:
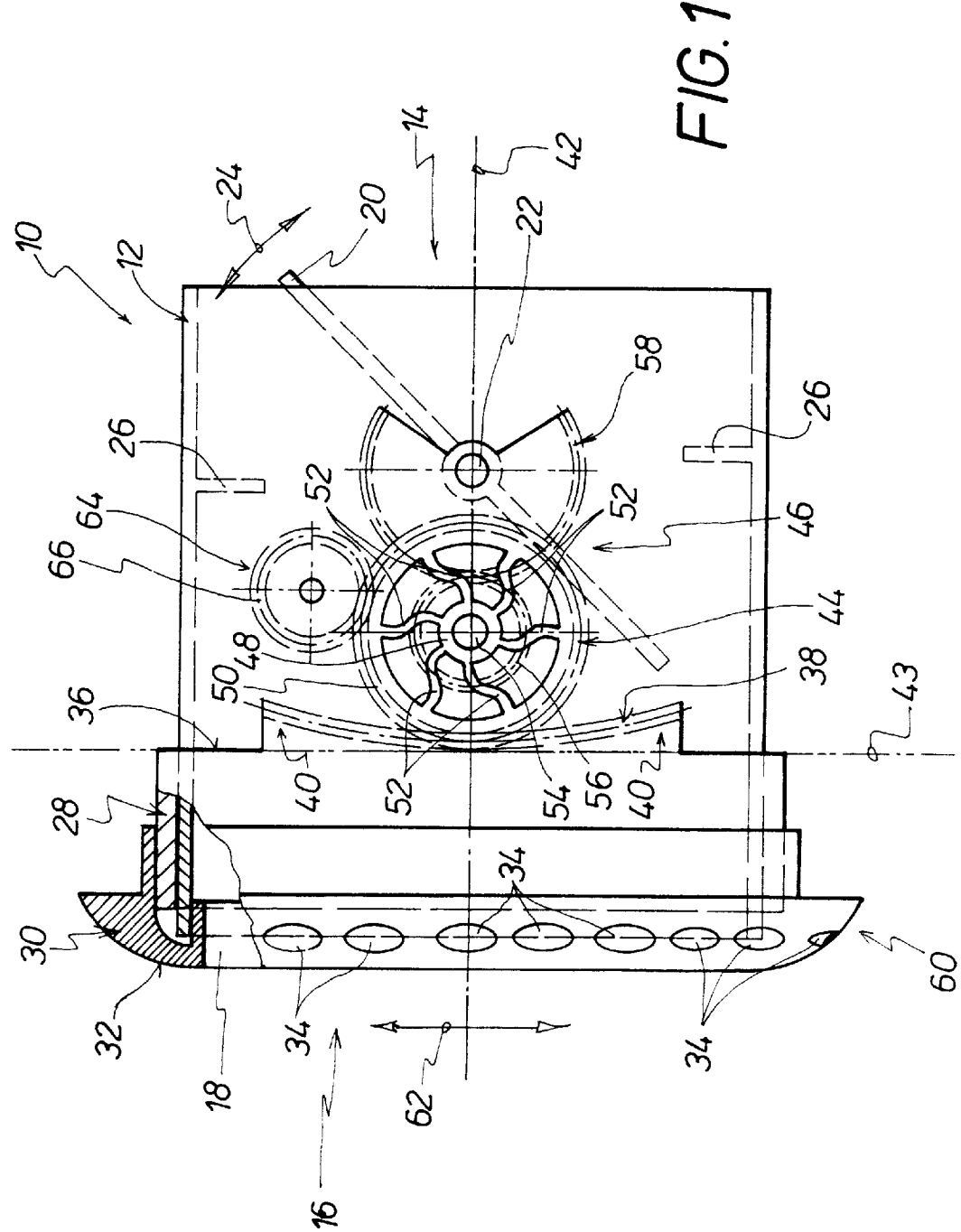
FIG. 1 is a partly sectional side view of the fresh air nozzle device.

FIG. 1 diagrammatically shows as a side view a configuration of the fresh air nozzle device 10 in partial section. The fresh air nozzle device 10 has a housing 12 which, at its inlet side 14, is for example of a cross-section of a square rounded-off configuration, while at its outlet side 16 it is formed with a circular opening 18 or a circular opening edge. At the inlet side, in the interior of the housing 12, a closure flap 20 is pivotable about a spindle 22 between a closed position and an open position, as is indicated by the arcuate double-headed arrow 24. For sealingly closing the fresh air nozzle device 10, the housing 12 is provided at the inside thereof with closure ribs 26 against which the closure flap 10 bears in the closed position.

An actuating ring 28 is rotatably and axially immovably mounted to the circular edge 18 of the opening of the housing 12. The actuating ring 28 is connected to a control ring 30. At its visible side 32, the control ring 30 can be provided with any desired surface structuring 34.

At its rearward peripheral edge 36 the actuating ring 28 is provided with a toothed rack element 38 which extends along a peripheral portion of the actuating ring 28 and which is of an arcuately curved configuration in such a way that it projects rearwardly, with its two end portions 40 which are remote from each other in the peripheral direction, out of a central plane 43 which is perpendicular to the longitudinal axis 42 of the housing 12. That central plane 43 is indicated in FIG. 1 by the doubled-dashed-dotted line 43, and it is oriented perpendicularly with respect to the plane of the drawing in FIG. 1.

A drive gear 44 of a gear transmission 46 is in meshing engagement with the arcuately curved toothed rack element 38. The drive gear 44 has a gear hub 48 and a gear ring 50 which are connected together by means of resiliently yielding spoke elements 52. The gear hub 48 is rotatably mounted on a trunnion portion 54 which projects away from the housing 12.

An intermediate gear 56 is fixedly connected to the gear hub 48 of the drive gear 44 and is in meshing engagement with an output or driven gear 58. The driven gear 58 is for example only in the form of a gear segment and it is fixedly connected to the spindle 22 of the closure flap 20.

FIG. 1 shows the actuating ring 28 with the control ring 30 which form an actuating element 60 of the fresh air nozzle device 10 in the central position in which the drive gear 44 is at the lowest central portion of the toothed rack element 38 and the closure flap 20 assumes an angle of about 450 between its possible closed position and its possible open position. When the actuating element 60 is rotated in one direction or the other, which is indicated in FIG. 1 by the double-headed arrow 62, then the toothed rack element 38 is moved in the peripheral direction of the housing 12 and thus displaces the gear transmission 46, whereby the closure flap 20 is displaced as desired. For the purposes of setting a given operating characteristic in regard to force or torque, in respect of the actuating element 60, upon displacement thereof, it is appropriate for the gear transmission 46 to be combined with a fluid brake 64. For that purpose the fluid brake 64 has a gear 66 which meshes with a gear of the gear transmission 46. FIG. 1 shows a configuration in which the gear 66 of the fluid brake 64 meshes with the drive gear 44 of the gear transmission 46.

In order to permit displacement of the actuating element 60 in very small angular steps, that is to say in a very finely stepped fashion, the actuating ring 28 of the annular actuating element 60, at a spacing from the toothed rack element 38 in the peripheral direction, is formed with a fine ratchet tooth arrangement 68 which is provided in the peripheral direction, as can be seen from FIG. 2. A ratchet element 70 resiliently engages into the fine ratchet tooth arrangement 68 at the corresponding portion of the peripheral edge 36 of the actuating ring 28. The ratchet element 70 can be formed for example by a resiliently mounted pin, a resilient mounted ball or by a spring element in the form of a leaf spring or the like.

What is claimed is:

1. A fresh air nozzle device for the passenger compartment of a vehicle, comprising a closure flap (20) which is mounted in a housing (12) at the inlet side by means of a spindle (22), and an actuating element (60) which is connected to the closure flap (20), wherein at the outlet side the housing (12) has a circular opening edge (18) at which there is rotatably provided an actuating ring (28) which forms the actuating element (60) and which is provided with a toothed rack element (38) which extends along a peripheral portion of the actuating ring (28) and meshes with a gear element (44) mounted at the spindle (22) of the closure flap (20), characterised in that the gear element is a drive gear (44) of a gear transmission (46) which is provided on the housing (12) and which has a driven gear (58), that the toothed rack element (38) is disposed in an arcuately curved configuration such that with its two end portions (40) which are remote from each other in the peripheral direction it projects rearwardly out of a central plane (43) which is perpendicular to the longitudinal axis (42) of the housing (12), and that the drive gear (44) meshing with the arcuately curved toothed rack element (38) has a gear ring (50) connected to a gear hub (48) by means of resiliently yielding spoke elements (52).

2. A fresh air nozzle device as set forth in claim 1 characterised in that the actuating ring (28) is connected to a control ring (30).

3. A fresh air nozzle device as set forth in claim 1 characterised in that a gear of the gear transmission (46) meshes with a gear (66) of a fluid brake (64).

4. A fresh air nozzle device as set forth in claim 3 characterised in that the gear (66) of the fluid brake (64) meshes with the drive gear (44) of the gear transmission (46).

5. A fresh air nozzle device as set forth in claim 1 characterised in that the actuating ring (28), at a spacing from the toothed rack element (38), is provided with a fine ratchet tooth arrangement (68) which is provided in the peripheral direction and into which a ratchet element (70) provided on the housing (12) resiliently engages.

\* \* \* \* \*

UNITED STATES PATENT AND TRADEMARK OFFICE
CERTIFICATE OF CORRECTION

PATENT NO.    : 6,074,295
DATED         : June 13, 2000
INVENTOR(S)   : Siegfried Volk It is certified that error appears in the above-identified patent and that said Letters Patent are hereby corrected as shown below:

Column 4, line 37,  now reads:    "450 between its possible closed position"
                    should read:  -- 45° between its possible closed position --.

Signed and Sealed this

First Day of May, 2001

Attest:

NICHOLAS P. GODICI

Attesting Officer    Acting Director of the United States Patent and Trademark Office